United States Patent [19]

Ishikawa

[11] Patent Number: 4,722,196

[45] Date of Patent: Feb. 2, 1988

[54] DEVICE FOR CONTROLLING REFRIGERATION CYCLE CAPACITY

[75] Inventor: Haruo Ishikawa, Fujinomiya, Japan

[73] Assignee: Kabushiki Kaisha Toshiba, Kawasaki, Japan

[21] Appl. No.: 917,895

[22] Filed: Oct. 10, 1986

[30] Foreign Application Priority Data

Oct. 31, 1985 [JP] Japan .................. 60-242635

[51] Int. Cl.$^4$ ............................................. F25B 41/00
[52] U.S. Cl. ...................................... 62/209; 62/193; 62/228.4
[58] Field of Search ................. 62/228.4, 215, 228.3, 62/209, 208, 228.1, 228.5, 192, 193, 126, 129

[56] References Cited

U.S. PATENT DOCUMENTS 3,411,313 11/1968 Brown et al. .................. 62/192
3,499,297 3/1970 Ruff et al. .................. 62/228.4 X

FOREIGN PATENT DOCUMENTS 55-1151   1/1980  Japan .
59-26862  7/1984  Japan .
59-185955 10/1984 Japan .
60-253770 12/1985 Japan .

Primary Examiner—Harry Tanner
Attorney, Agent, or Firm—Schwartz, Jeffery, Schwaab, Mack, Blumenthal & Evans

[57] ABSTRACT

In a refrigeration cycle in which a capacity-variable compressor a condenser, an expansion mechanism and an evaporator are connected in the order named, a device for controlling the capacity in the refrigeration cycle comprising a means for detecting the temperature of the compressor or the temperature of the gas discharged therefrom and a control device for limiting the maximum rotational speed of the compressor when the output from the means for detecting the temperature indicates a detected temperature lower than a predetermined level.

3 Claims, 5 Drawing Figures

DEVICE FOR CONTROLLING REFRIGERATION CYCLE CAPACITY

BACKGROUND OF THE INVENTION

The present invention relates to a device for controlling refrigeration cycle capacity and, more particularly, to a control device for ensuring the reliable operation of a compressor.

Referring first to FIG. 5, the construction of an air conditioner of the type in which the rotation (r.p.m.) of a compressor is varied by means of an inverter, thereby varying the refrigeration cycle capacity, will be described. In FIG. 5, reference numeral 1 designates a compressor; 2, an indoor heat exchanger which functions as a condensor in case of heating; and 3, an outdoor heat exchanger which functions as an evaporator. The indoor and outdoor heat exchangers 2 and 3 are intercommunicated through capillary tubes 4a and 4b which constitute a decompression device and a bypass circuit 6 with a check valve 5 which is used to bypass the capillary tube 4a in case of cooling operation. Reference numeral 7 designates a four port connection valve for selecting a refrigeration line. The rotation of the compressor 1 is controlled by an inverter control device 8. The output signal from a temperature sensor 9 which detects a suction temperature of the indoor heat exchanger 2 is applied to an arithmetic unit 10 comprising a microcomputer or the like and in response to a temperature difference between the detected suction temperature and a set point temperature, the output signal from the arithmetic circuit 10 is applied through a driving circuit 11 to an inverter 12, thereby controlling the rotation of the compressor 1. Reference numeral 13 is a commercial power source which is electrically connected not only to the arithmetic circuit 10 through a power supply 14 but also to the inverter 12 through a converter 15.

In the air conditioner with the above-described construction, the number of revolutions of the compressor 1 is dependent upon the difference between an indoor temperature and a set point. As a result, in case of the compressor 1 of the type in which, as in the case of a rotary compressor, a reservoir at which is stored a lubricating oil has a high pressure, the compressor 1 is driven at a low temperature and at a high pressure and a large amount of a lubricating oil is dissolved into a refrigerant and fed into a circulating refrigerant, resulting in the decrease of the lubricating oil for the compressor. When the compressor is rotated at a high rotational velocity for a relatively long period of time with an insufficient quantity of a lubricating oil which has been caused by the abovementioned drive of the compressor 1, seizure and wear of sliding surfaces tend to occur very frequently, causing the problem of reliable operation of the air conditioner.

SUMMARY OF THE INVENTION

The present invention has been made to substantially overcome the above and other problems encountered in the prior art air conditioners and is, for its object, to provide a device for controlling refrigeration cycle capacity which can avoid insufficient lubrication of a compressor at low temperatures, thereby improving reliability in operation of the compressor.

To the above and other ends, in a refrigeration cycle in which a capacity-variable compressor, a condenser, an expansion mechanism and an evaporator are connected in the order named, the present invention provides a means for detecting the temperature of a compressor or the temperature of the gas discharged out of the compressor and a control device for limiting a maximum rotational speed of the compressor when the output signal from the temperature sensor is less than a predetermined level.

DESCRIPTION OF THE PREFERRED EMBODIMENT

A preferred embodiment of the present invention will be described in detail hereinafter with reference to the accompanying drawings.

Figure 1:
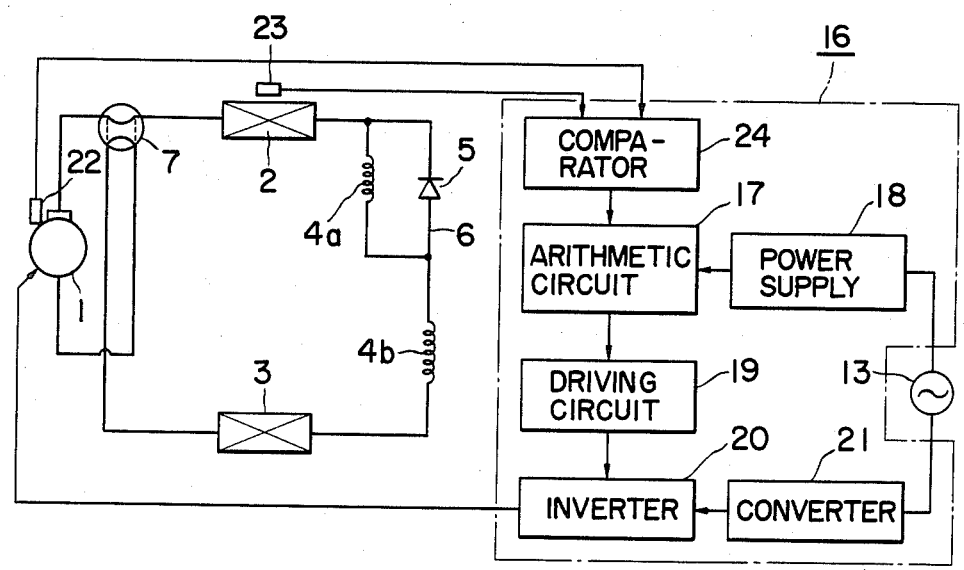
FIG. 1 is a block diagram illustrating a preferred embodiment of a device for controlling refrigeration cycle in accordance with the present invention.
Figure 5:
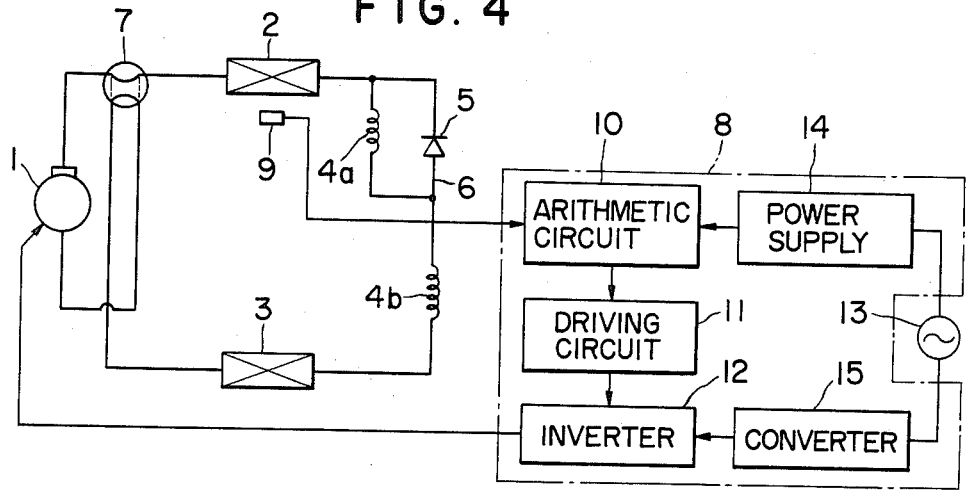
FIG. 5 is a block diagram illustrating a conventional device for controlling refrigeration cycle capacity.

FIG. 1 is a block diagram of a device for controlling refrigeration cycle capacity in accordance with the present invention. In both of FIGS. 1 and 5, same reference numerals are used to designate similar parts so that description of the component parts which have already described with reference to FIG. 5 will not be made. Reference numeral 16 designates an inverter control device for controlling the rotation of the compressor 1. The inverter control device 16 comprises an arithmetic circuit 17 consisting of a microcomputer or the like, a power supply 18 for delivering the power from a power source 13 to the arithmetic circuit 17, a transistorized driving circuit 19 connected to the output terminal of the arithmetic circuit 17, an inverter 20 responsive to the output signal from the driving circuit 19 for varying the rotation of the compressor 1 and a converter 21 for supplying the power from the power source 13 to the inverter 20.

The output signal from a compressor temperature sensor 22 for detecting the temperature of the compressor 1 or the temperature of the gas discharged out of the compressor 1 and the output signal from a condenser temperature sensor 23 for detecting the temperature or pressure of the indoor heat exchanger 2 which functions as a condensor in case of heating cycle, are applied through a comparator 24 to the input terminals of the arithmetic circuit 17.

Figure 4:
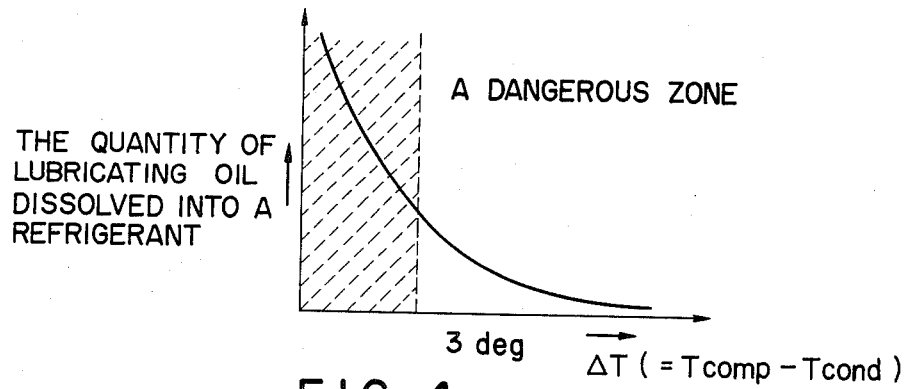
FIG. 4 is a graph illustrating the relationship between the temperature difference $\Delta T$ between a compressor and a condensor on the one hand and the quantity of a lubricating oil dissolved into a refrigerant.

Meanwhile, the compressor temperature Tcomp, the condenser temperature Tcond and a lubricating oil stored on a high pressure side of the compressor have the relationships as shown in FIG. 4. That is, when the temperature difference $\Delta T (=\text{Tcomp}-\text{Tcond})$ between the compressor temperature Tcomp and the condensor temperature Tcond is less than three degrees (°C.), the lubricaitng oil dissolved into the circulating refrigerant is significantly increased in quantity so that lubrication of the compressor is adversely affected, as confirmed by the experimental results.

Figure 2:
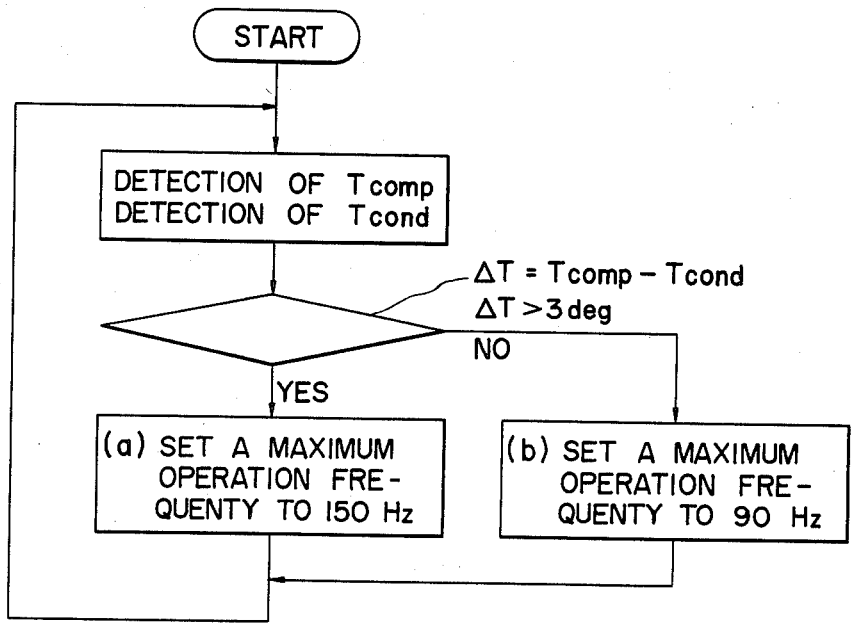
FIG. 2 is a flowchart used to explain the mode of operation thereof.

Therefore, according to the present invention, the inverter control device 16 incorporates a control program for performing the operations as shown in FIG. 2. That is, when the temperature difference ΔT obtained by the comparison between the temperature Tcomp detected by the compressor temperature sensor 22 and the temperature Tcond detected by the condensor temperature sensor 23 is higher than 3° C., the inverter 20 is so controlled as to operate at a maximum output of 150 Hz, but when the temperature difference ΔT drops equal to or lower than 3° C., the maximum output of the inverter 20 is limited to 90 Hz. Therefore when the outdoor temperature is low and when the pressure of the high pressure side is high, there is no temperature difference between the compressor 1 and the condenser 2 so that the lubricating oil dissolves into the refrigerant within the compressor 1 and consequently the lubricating oil is decreased in quantity in the compressor. However, according to the present invention, the maximum rotational velocity of the compressor 1 is suppressed so that the adverse lubricating action in the compressor 1 can be avoided.

Figure 3:
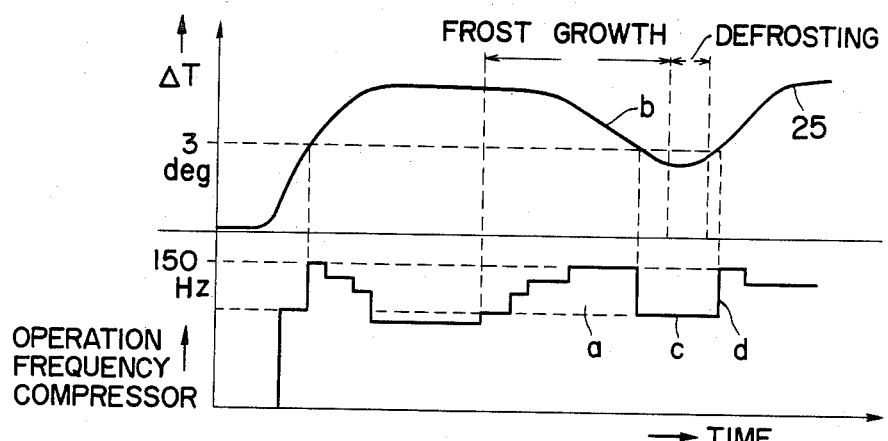
FIG. 3 is a diagram used also to explain the mode of operation thereof.

FIG. 3 shows the mode of operation described above. The curve 25 indicates the temperature difference ΔT which varies from time to time while the curve 26 indicates the operation frequency of the compressor 1 controlled by the inverter control device 16. When the frost growth is increased in the heating cycle, the heating capacity drops. Therefore the operation frequency of the compressor 1 is gradually increased, thereby maintaining a satisfactory heating capacity. Therefore, the operation frequency of the compressor 1 approaches to a maximum rotational speed (the time period a). Meanwhile as the frost growth is increased, the temperature difference ΔT is gradually decreased (the time period b) and when the temperature difference ΔT becomes equal to or less than 3° C., the maximum operation frequency is limited to 90 Hz (the time period c). When the temperature difference ΔT becomes higher than 3° C., the above-described limitation of the maximum operation frequency is removed and the conventional control is resumed (the time period d).

Therefore, under the worse lubricating condition, the rotational speed of the compressor 1 is restricted to a value below a predetermined level so that it becomes possible to improve reliability in operation of the compressor and a lifetime of the air conditioner.

So far it has been described that the insufficient lubrication in the compressor is detected in terms of the temperature difference ΔT, but it is also possible to detect the decrease in the temperature difference ΔT in terms of a compressor temperature or a temperature of the discharged gas so that in response to the detection of the compressor temperture or the discharged-gas temperature, the control can be carried out in a manner substantially similar to that described above.

In addition, in order to maintain a predetermined performance of the air conditioner, a timer may be incorporated in such a way that the above-described limitation may be imposed on a predetermined time interval after reaching a limit condition.

So far the present invention has been described in detail in connection with the heat pump air conditioner, but it is to be understood that the present invention may equally be applied to other types of refrigerators.

As described above, according to the present invention, in response to the detection of the decrease in quantity of a lubricating oil in the compressor, the maximum rotational speed of the compressor is limited so that reliability in operation of the compressor can be improved and a lifetime of the air conditioner or refrigerator can be increased.

What is claimed is:

1. A device for controlling refrigeration cycle capacity comprising:
    a refrigeration cycle in which a rotary-type compressor, a condenser, an expansion mechanism and an evaporator are connected in the order named;
    means for detecting at least one of the temperature of a point on said compressor and the temperature of a gas discharged from said compressor; and
    means for limiting the maximum rotational speed of said compressor when an output signal from said detection means indicates that the detected temperature becomes lower than a predetermined temperature.

2. A device as set forth in claim 1 further comprising:
    means for detecting the temperature of said condenser; and
    means for obtaining the difference between at least one of the temperature of said point on said compressor and the temperature of the gas discharged therefrom and the temperature of said condenser, whereby in response to an output signal from said means for obtaining the temperature difference, said means for limiting the maximum rotational speed limits the rotational speed of said compressor.

3. A device as set forth in claim 1 wherein the temperature of said point on said compressor is indicative of the temperature of said gas discharged from said compressor.

* * * * *